United States Patent
Jacob et al.

(10) Patent No.: US 6,946,522 B2
(45) Date of Patent: Sep. 20, 2005

(54) THERMOPLASTIC ELASTOMERS WITH IMPROVED CORING PROPERTIES

(75) Inventors: Sunny Jacob, Akron, OH (US); Marvin C. Hill, Hudson, OH (US)

(73) Assignee: Advanced Elastomer Systems L.P., Akron, OH (US)

(*) Notice: Subject to any disclaimer, the term of this patent is extended or adjusted under 35 U.S.C. 154(b) by 73 days.

(21) Appl. No.: 10/609,911

(22) Filed: Jun. 30, 2003

(65) Prior Publication Data

US 2004/0266948 A1 Dec. 30, 2004

(51) Int. Cl.⁷ .............................. C08F 8/00; C08L 9/00; C08L 23/04; C08L 25/02; C08L 27/12
(52) U.S. Cl. .................. 525/191; 525/199; 525/232; 525/240; 525/241
(58) Field of Search ................................ 525/191, 199, 525/232, 240, 241

(56) References Cited

U.S. PATENT DOCUMENTS

| | | | |
|---|---|---|---|
| 4,664,275 A | 5/1987 | Kasai et al. | 215/247 |
| 4,810,752 A | 3/1989 | Bayan | 525/98 |
| 4,871,796 A * | 10/1989 | Komatsu et al. | 524/474 |
| 4,906,683 A * | 3/1990 | Komatsu et al. | 524/528 |
| 4,975,308 A | 12/1990 | Bayan et al. | 428/34.1 |
| 5,247,015 A | 9/1993 | Bayan | 525/99 |

FOREIGN PATENT DOCUMENTS

| | | |
|---|---|---|
| JP | 2001-112846 | 4/2001 |
| WO | WO 01/12717 A1 | 2/2001 |
| WO | WO 02/064676 A2 | 8/2002 |

OTHER PUBLICATIONS

Grant & Hackh's Chemical Dictionary, 1987, McGraw–Hill Book Company, Fifth Edition, p. 407.*
Grant, Roger et al, Grant & Hackh's Chemical Dictionary, 1987, McGraw–Hill Book Company, 5th Edition, p. 102.*
Allinger, Norman et al, Organic Chemistry, 1971, Worth Publishers, Inc., p. 335.*

* cited by examiner

Primary Examiner—Nathan M. Nutter
(74) Attorney, Agent, or Firm—William G. Muller

(57) ABSTRACT

Thermoplastic vulcanizates having improved coring properties, comprising a blend of thermoplastic polypropylene resin, vulcanized butyl rubber, a SEPS block copolymer and a polybutene oil plasticizer.

7 Claims, No Drawings

THERMOPLASTIC ELASTOMERS WITH IMPROVED CORING PROPERTIES

FIELD OF THE INVENTION

This invention relates generally to thermoplastic elastomer materials. The invention relates more specifically to thermoplastic elastomers prepared from blends of thermoplastic olefin resin and dynamically vulcanized butyl rubber, modified by the addition of a block copolymer and a polybutene plasticizer. The compositions of the invention have improved coring properties while maintaining good barrier properties with respect to oxygen and water transmission, yet are easily processed.

BACKGROUND OF THE INVENTION

Thermoplastic elastomers are rubber-like materials that, unlike conventional vulcanized rubbers, can be processed and recycled like thermoplastic materials. When the thermoplastic elastomer contains a vulcanized rubber, it may also be referred to as a thermoplastic vulcanizate (TPV), defined as a thermoplastic elastomer with a chemically cross-linked rubbery phase, produced by dynamic vulcanization.

Thermoplastic vulcanizates containing butyl or halogenated butyl rubber as the rubber phase and a thermoplastic polyolefin as the plastic or resin phase are known in the art. In order to obtain good processability, the compositions may contain additives including oil, such as mineral oil, and slip agents, such as silicone fluids or fatty amides. While such additives improve processability characteristics, they adversely affect the barrier properties of the thermoplastic vulcanizates. Good barrier properties are important when the thermoplastic vulcanizates are used in contact with foods and beverages, and particularly in pharmaceutical applications.

It is therefore desirable to provide a soft, easily processable thermoplastic vulcanizate with good gas barrier properties for use in pharmaceutical applications, while retaining a high level of cleanliness.

SUMMARY OF THE INVENTION

The present invention is based on the discovery that a thermoplasic vulcanizate composition having the desired characteristics of softness, processability and moldability, elasticity and good gas barrier properties is provided by incorporating into a blend of thermoplastic polyolefin resin and dynamically vulcanized butyl rubber, specific concentrations of a combination of hydrogenated block copolymer and polybutene oil plasticizer. In detail the present invention relates to a thermoplastic vulcanizate composition comprising (a) 100 parts by weight of a rubber selected from the group consisting of butyl rubber, halobutyl rubber, and mixtures thereof;

(b) from about 20 to about 25 parts by weight of a thermoplastic polypropylene resin;

(c) from about 30 to about 40 parts by weight of a hydrogenated poly(styrene-b-isoprene-b-styrene) block copolymer; and (d) from about 45 to about 55 parts by weight of a polybutene oil plasticizer, wherein said rubber is at least partially vulcanized.

The composition of the invention overcomes the deficiencies described above, and is highly suitable for applications requiring contact with pharmaceuticals. It is also easily moldable by injection molding, and the resulting articles have excellent resealing capability and resistance to coring in applications where needle punctures are utilized.

DETAILED DESCRIPTION OF THE INVENTION

A thermoplastic elastomer (TPE) can be generically defined as a rubber-like material that, unlike conventional rubbers, can be processed and recycled like thermoplastic materials (ASTM D1566). When the TPE contains a vulcanized rubber, it may also be referred to as a thermoplastic vulcanizate (TPV), defined as a TPE with a chemically cross-linked rubbery phase, produced by dynamic vulcanization (ASTM D1566).

As used herein, the terms TPE and TPV refer to a blend of thermoplastic resin and vulcanized rubber. Such materials have the characteristic of elasticity, i.e. they are capable of recovering from large deformations quickly and forcibly. One measure of this rubbery behavior is that the material will retract to less than 1.5 times its original length within one minute, after being stretched at room temperature to twice its original length and held for one minute before release (ASTM D1566). Another measure is found in ASTM D412, for the determination of tensile set. The materials are also characterized by high elastic recovery, which refers to the proportion of recovery after deformation and may be quantified as percent recovery after compression. A perfectly elastic material has a recovery of 100% while a perfectly plastic material has no elastic recovery. Yet another measure is found in ASTM D395, for the determination of compression set.

Thermoplastic Polyolefin Component

The term "thermoplastic polypropylene resin" as used herein in conjunction with the description of the thermoplastic vulcanizate denotes any propylene polymer resin which exhibits thermoplastic properties. A wide range of thermoplastic polypropylene resins and/or their mixtures have been used in the preparation of thermoplastic vulcanizates, including crystalline and semi-crystalline polypropylene homopolymers and copolymers.

As used in the specification and claims the term polypropylene includes homopolymers of propylene as well as reactor and/or random copolymers of propylene which can contain about 1 to about 30 weight percent of ethylene and/or an α-olefin comonomer of 4 to 20 carbon atoms, and mixtures thereof. The polypropylene can have different types of crystalline structure such as atactic, isotactic and syndiotactic, and different degrees of crystallinity including materials with a high percentage of amorphous structure such as the elastomeric polypropylenes. The preferred polypropylene type for practice of the invention is isotactic polypropylene homopolymer.

The polypropylenes mentioned can be made using conventional Ziegler/Natta catalyst systems or by single site catalyst systems. Commercially available polypropylenes may be used in the practice of the invention.

The amount of thermoplastic polypropylene found to provide useful thermoplastic vulcanizate compositions is from about 20 to about 25 parts by weight, per 100 parts of the rubber component (phr) of the composition.

Rubber Component

Butyl rubbers are preferred in the practice of the invention. As used in the specification and claims, the term butyl rubber includes copolymers of a major portion of an isoolefin and a minor portion, preferably not more than about 30 weight percent, of a conjugated multiolefin, and their halogenated derivatives. The copolymers generally comprise about 85 to 99.5 weight percent (preferably about 95 to 99.5 weight percent) of a $C_4$ to $C_7$ isoolefin and about 15 to 0.5 weight percent (preferably about 5 to 0.5 weight percent) of a multiolefin of 4 to 14 carbon atoms. Suitable conjugated multiolefins include isoprene, butadiene, dimethyl butadiene, piperylene, and the like. The preferred isoolefin is isobutylene (2-methylpropene) and the preferred multiolefin is isoprene (2-methyl-1,3-butadiene). Commercial butyl rubber (IIR) is a copolymer of isobutylene with minor amounts of isoprene.

Block Copolymer Component

The composition of the invention includes a SEPS component. This component is generally described as a hydrogenated poly(styrene-b-isoprene-b-styrene) block copolymer. One such material which is particularly suited for use in the invention is available as the range of Septon™ products, available from Septon Company of America Inc., a Kuraray Group company.

The amount of block copolymer component in the composition of the invention generally ranges from about 30 to about 40 parts by weight, per 100 parts of the rubber component of the composition.

In the preparation of thermoplastic elastomers of the invention, the block copolymer component was generally incorporated directly into the composition during production of the thermoplastic elastomer, in a one step process, so that it was an integral part of the composition. Since the block copolymer is hydrogenated, it contains very low levels of unsaturation and does not co-cure with the elastomer component of the thermoplastic elastomer during vulcanization. It is believed that the block copolymer forms a co-continuous matrix with the thermoplastic polyolefin resin in the thermoplastic elastomer. Alternatively, the block copolymer can be mechanically blended with a preformed thermoplastic elastomer composition.

Plasticizer Component

In the present invention it has been found that the inclusion of copolymer of isobutylene and n-butene (1-butene; α-butylene) in the thermoplastic vulcanizate provides unexpected barrier properties, when used in combination with the block copolymer component, in specific concentrations. The copolymer of isobutylene and n-butene, also known as polybutene, is present in the thermoplastic vulcanizate at levels of about 45 to about 55 parts by weight, per 100 parts of the rubber component of the composition.

The copolymer plasticizer is generally incorporated during the dynamic vulcanization, with a portion added prior to completion of the cure and the remainder added subsequent to the cure. Alternatively the plasticizer may be added to a preformed thermoplastic vulcanizate.

Fillers and Additives

Generally, the addition of fillers and/or additives is conventional in the art of thermoplastic vulcanizate preparation. The term "filler" as used herein refers to non-reinforcing fillers, reinforcing fillers, organic fillers and inorganic fillers. Preferably the filler is an inorganic filler such as talc, silica, clays, solid flame retardants, calcium carbonate, titanium dioxide, barium sulfate, carbon black, other mineral fillers and mixtures thereof. Any effective amount of filler may be added. Typically the filler may be added in an amount of up to about 60 weight percent, and preferably from about 2 to about 50 weight percent of the total thermoplastic vulcanizate composition. Suitable additives include pigments, antistatic agents, antioxidants (chemical or physical protectants), ultraviolet light stabilizers, antiblocking agents, lubricants, process oils, waxes, coupling agents for fillers and mixtures thereof. Additives such as polysiloxane fluids and fatty acid amides may be included to improve processability characteristics. Any effective amount of additive may be used. Typically the amounts range from about 0.05 to about 5 weight percent, and preferably from about 0.05 to about 3 weight percent, based on the total weight of the composition.

Fillers and/or additives may be added to the composition at any point in the preparation, for example prior to vulcanization, during vulcanization or after vulcanization. As an alternative, the thermoplastic vulcanizate may be produced without fillers or additives, which are then added in a later compounding operation.

Cure Systems

In the composition of the invention, the butyl rubber component of the thermoplastic vulcanizate will be partially or fully cured (vulcanized; crosslinked). Those of ordinary skill in the art will appreciate the appropriate quantities, types of cure systems, and processing conditions required to carry out the cure of the rubber and obtain the desired degree of cure. Any known cure system can be used, so long as it is suitable under the curing conditions for the rubber being used and is compatible with the thermoplastic polyolefin component of the thermoplastic vulcanizate. These cure systems include sulfur, sulfur donors, metal oxides, resin systems, hydrosilylation systems, high-energy systems and the like, both with and without accelerators and co-agents.

Phenolic resin cure systems are preferred for the preparation of the thermoplastic vulcanizates of the invention, and such cure systems are well known in the art and literature of vulcanization of rubbers. Their use is more fully described in U.S. Pat. No. 4,311,628 and U.S. Pat. No. 5,592,425, the disclosures of which are fully incorporated herein by this reference. For further details of phenolic cure systems see "Vulcanization and Vulcanizing Agents", W. Hoffman, Palmerton Publishing Company. Suitable phenolic curing resins and brominated phenolic curing resins are commercially available under the trade names SP-1045, CRJ-352, SP-1055 and SP-1056 from Schenectady Chemicals, Inc. Similar functionally equivalent phenolic curing resins may be obtained from other suppliers.

For halogenated butyl rubbers, a preferred cure system is one which is based on ZnO and/or MgO. In this system, the MgO does not act as an activator but as an acid acceptor to stabilize the rubber from dehydrohalogenation. Another cure system for halogenated butyl rubbers comprises ZnO and a maleimide product. Among the maleimide products, a bis-maleimide is especially superior in effectiveness and m-phenylene bismaleimide (4,4'-m-phenylene bismaleimide) (HVA-2) is preferred.

Organic peroxides with well known co-agents can also be used as a cure system, except where the butyl rubber is a non-halogenated butyl rubber. The role of the co-agent in peroxide cure systems is to enhance the cure state and to inhibit chain fragmentation or scission effects.

General Procedure

The rubber component of the thermoplastic vulcanizate is generally present as small, i.e. micro-size, particles within a co-continuous matrix of thermoplastic polyolefin resin and SEPS block copolymer. This morphology is believed to enhance the coring properties of the thermoplastic vulcanizate. The rubber cure is achieved by adding an appropriate cure system to a blend of thermoplastic polyolefin and rubber, the curing the rubber to the desired degree under vulcanizing conditions. It is preferred that the rubber be cured by the process of dynamic vulcanization. As used in the specification and claims, the term "dynamic vulcanization" means a curing process for a rubber contained in a blend of thermoplastic resin, wherein the curable rubber is vulcanized under conditions of shear at a temperature above the melting point of the thermoplastic polyolefin component. The rubber is thus simultaneously crosslinked and dispersed as fine particles within the thermoplastic polyolefin matrix, although as noted above, other morphologies may also exist. Dynamic vulcanization may be carried out in conventional mixing equipment such as roll mills, Banbury mixers, Brabender mixers, continuous mixers, mixing extruders such as single and twin-screw extruders, and the like. The unique characteristic of dynamically cured compositions is that, notwithstanding the fact that the rubber component is cured, the compositions can be processed and reprocessed by conventional plastic processing techniques such as extrusion, injection molding and compression molding. Scrap or flashing can be salvaged and reprocessed.

Preferably, after the thermoplastic polyolefin and rubber are intimately mixed, the cure system is added. Heating and masticating at vulcanization temperatures are then generally adequate to achieve the curing reaction in a few minutes or less. If shorter cure times are desired, higher temperatures may be used. A suitable range of cure temperature is from about the melting point of the thermoplastic polyolefin, i.e. about 120° C. to 250° C. or higher. Typically the range is from about 150° C. to about 225° C. To obtain thermoplastic vulcanizates, it is preferred that mixing continues without interruption until the desired cure level is obtained. Mixing is continued until a maximum mixing torque indicates that cure has occurred.

The term "partially cured" as used herein means that not all of the rubber component capable of being cured by the cure system, has been cured. The term "fully cured" as used herein means that the rubber component has been cured to a state in which the elastomeric properties of the cured rubber are similar to those of the same rubber in its conventional vulcanized state, apart from the thermoplastic vulcanizate composition. Simply stated, fully cured means that all of the rubber component which is capable of being cured, has been cured. The degree of cure can be described in terms of gel content or conversely, extractable components. Where the determination of extractables is an appropriate measure of the state of cure, fully cured thermoplastic vulcanizates are produced by vulcanizing the curable rubber to the extent that the composition contains, with increasing preference in the order given, no more than about 1 to 4, preferably 2 to 3, weight percent of the rubber extractable by a solvent for the rubber. Compositions having less than about 0.5 weight percent extractable rubber are highly preferred. Alternatively the degree of cure may be expressed in terms of crosslink density. All of these descriptions are known in the art, for example from U.S. Pat. No. 5,100,947 and U.S. Pat. No. 5,157,081.

The thermoplastic vulcanizate of the present invention is used in processes for making shaped articles by conventional techniques such as injection molding, extrusion molding, blow molding, lamination, calendaring, overmolding and over-extrusion. The finished articles are particularly useful as pharmaceutical closures such as blood tube stoppers or hypodermic vial closures.

EXAMPLES

The following general procedure was used in the preparation of the thermoplastic vulcanizate examples. The thermoplastic polypropylene resin, crosslinkable rubber, SEPS block copolymer, polybutene plasticizer, cure agent (and cure coagent or catalyst if used) are added to the heated mixer. The cure agent may also be incorporated into the formulation at a target range of melt temperature, preferably above the thermoplastic melt temperature and below about 290° C. for a specified period of time and at a shear rate greater than about 200 reciprocal seconds, by a suitable technique such as injection as an oil solution, as neat solids or as neat melts or as masterbatches. Diluted solutions or masterbatches are preferred. The cure may be split into multiple additions. The polybutene oil plasticizer may be added during the initial and/or final stages of the dynamic vulcanization. Optional additives and fillers may be added before or after cure as a slurry, or as a paste in compatible process oil. The thermoplastic resin can also be added during mastication before or after cure, or as a split between before and after cure. The mixing and shear rate for development of discrete rubber phase morphology and desired product properties can be achieved through choice of screw design and screw speed. It is convenient to follow the progress of vulcanization by monitoring stock melt temperature, mixing energy and/or mixing torque. The mixing torque or mixing energy curve generally goes through a maximum, after which mixing can be continued to achieve the desired cure state and fabricability of the blend.

The following materials were used in the examples.

Chlorobutyl 1068—chlorinated isoprene/isobutylene rubber, 33–43 Mooney viscosity (1+8) 125° C., from ExxonMobil Chemical Company.
PP EOD 96-36—polypropylene, MFI 750, from Fina.
PP F180A—Polypropylene homopolymer from Aristech Sunoco Chemicals.
PP TI4040—Polypropylene impact copolymer from Aristech Sunoco Chemicals.
PP D038S—Polypropylene homopolymer from Aristech Sunoco Chemicals.
Indopol 100H—copolymer of isobutylene and n-butene, from BP Amoco.
Parapol 950—copolymer of isobutylene and butene, from ExxonMobil Chemicals.
Septon 2002, 4033, 4044 and 4077—hydrogenated poly (styrene-b-isoprene-b-styrene) block copolymers (SEPS), having a range of molecular weights, from Septon Company of America.
Butyl zimate—cure accelerator, from Vanderbilt.
DC 200—dimethyl polysiloxane fluid from Dow Corning.
Icecap K Clay—aluminum silicate, from Burgess Pigment.
ZnO—zinc oxide (any source).
Maglite—magnesium oxide, from C. P. Hall.
Zinc stearate—from Harwick Chemical.
BT2202—Benwood talc, from IMI Fabi, LLC.

The following measurement methods (standards) were used in determining the properties of compositions of the invention:

| | |
|---|---|
| Hardness (Shore A) | ASTM D2240 |
| UTS (ultimate tensile strength) | ASTM D412 |
| UE (ultimate elongation) | ASTM D412 |
| M100 (modulus) | ASTM D412 |
| CS (compression set) | ASTM D395(B) |
| Oxygen permeability | ASTM D1434 |
| TS (tension set) | ASTM D412 |
| MVT (moisture vapor transmission) | ASTM F1249 |
| Cores/100 punctures | Discs (0.075–0.125 inches thick) | of thermoplastic vulcanizate were molded or extruded, then crimped onto 10 cc vials to form stoppers. A hypodermic syringe fitted with an unused 20 gauge needle was filled with distilled water, then was inserted at a 90 degree angle into the center of the stopper, and 1–2 cc of water was expelled into the vial to release any cores formed in the needle. This step was repeated five times on each of 20 vials/stoppers, using care not to insert the needle at the same point more than once. After each of the stoppers had been punctured five times, the total number of cores was counted. Needles were replaced after 25 punctures.

Examples C1–C6 set forth formulations and properties of thermoplastic vulcanizates prepared using concentrations of the various components which are outside of the ranges found to provide the desired properties, in particular the property of low coring. Examples 7–18 set forth thermoplastic vulcanizates comprising butyl rubber, polypropylene, SEPS and polybutene oil in concentrations found to provide unexpectedly improved coring performance. It is notable

TABLE 1

|  | C1 | C2 | C3 | C4 | C5 | C6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Chlorobutyl 1068 | 100 | 100 | 100 | 100 | 100 | 100 | 100 | 100 | 100 | 100 | 100 | 100 | 100 | 100 | 100 | 100 | 100 | 100 |
| PP EOD 96-36 | 30 | 30 |  |  |  |  |  |  |  |  |  |  |  |  | 20 |  |  |  |
| PP F180A |  |  | 20 | 20 | 20 | 20 | 20 | 20 | 20 | 20 | 20 | 20 | 20 | 20 | 20 |  |  |  |
| PP D038S |  |  |  |  |  |  |  |  |  |  |  |  |  |  |  |  | 20 |  |
| PP TI4040 |  |  |  |  |  |  |  |  |  |  |  |  |  |  |  |  |  | 20 |
| Septon 4044 |  |  | 30 | 30 | 40 | 40 | 30 | 30 | 40 | 35 | 35 | 40 | 30 |  |  | 30 | 30 | 30 |
| Septon 2002 | 20 | 20 |  |  |  |  |  |  |  |  |  |  |  |  |  |  |  |  |
| Septon 4077 |  |  |  |  |  |  |  |  |  |  |  |  |  | 30 |  |  |  |  |
| Septon 4033 |  |  |  |  |  |  |  |  |  |  |  |  |  |  | 40 |  |  |  |
| Parapol 950 | 35 |  | 35 | 35 | 35 | 35 | 55 | 55 | 55 | 45 | 45 | 55 |  | 55 | 55 | 55 | 55 | 55 |
| Indopol 100H |  |  |  |  |  |  |  |  |  |  |  |  | 55 |  |  |  |  |  |
| DC 200 |  |  | 5 | 5 | 5 | 5 | 5 | 5 | 5 | 5 | 5 | 5 | 5 | 5 | 5 | 5 | 5 | 5 |
| ZnO | 4 | 4 | 1.5 | 3 | 1.5 | 3 | 1.5 | 3 | 3 | 2 | 2 | 1.5 | 1.5 | 1.5 | 1.5 | 1.5 | 1.5 | 1.5 |
| BT2202 |  |  | 30 | 30 | 30 | 30 | 30 | 30 | 30 | 30 | 30 | 30 | 30 | 30 | 30 | 30 | 30 | 30 |
| Clay | 10 | 10 |  |  |  |  |  |  |  |  |  |  |  |  |  |  |  |  |
| TOTAL[1] | 204 | 169 | 226.5 | 228 | 236.5 | 238 | 246.5 | 248 | 258 | 242 | 242 | 256.5 | 246.5 | 246.5 | 256.5 | 246.5 | 246.5 | 246.5 |

[1] Each example also contained 2 phr MgO, 1 phr zinc stearate and 2 phr butyl zimate

TABLE 2

|  | C1 | C2 | C3 | C4 | C5 | C6 | 7 | 8 | 9 |
|---|---|---|---|---|---|---|---|---|---|
| Hardness-A | 56.3 | 71.3 | 52.7 | 53.7 | 56.3 | 53.8 | 47.1 | 42.8 | 48.5 |
| UTS (psi) | 342 | 614 | 451 | 391 | 482 | 408 | 391 | 271 | 300 |
| UE (%) | 376 | 410 | 337 | 343 | 371 | 360 | 361 | 397 | 353 |
| M100 (psi) | 187 | 325 | 198 | 198 | 225 | 228 | 164 | 126 | 139 |
| Tension set (%) | 11.5 | 11 | 8 | 9.5 | 9.5 | 11 | 8 | 8 | 8.8 |
| CS (%) 100° C., 22 hrs | 38.7 | 62.1 | 30.3 | 37.8 | 35.6 | 50.9 | 31.7 | 36.4 | 37.6 |
| MVT g/m$^2$/day | 0.55 | 0.50 | 0.39 | 0.29 | 0.33 | 0.26 | 0.41 | 0.34 | 0.35 |
| O$_2$ cc/m$^2$/day | 343 | 242 | 279 | 275 | 288 | 304 | 324 | 778 | 346 |
| Cores/100 punctures | 13 | 22 | 6 | 28 | 18 | 16 | 2 | 4 | 4 |

|  | 10 | 11 | 12 | 13 | 14 | 15 | 16 | 17 | 18 |
|---|---|---|---|---|---|---|---|---|---|
| Hardness-A | 53.6 | 51.6 | 50.7 | 48.0 | 49.4 | 54.1 | 46.1 | 51.8 | 43.9 |
| UTS (psi) | 489 | 417 | 372 | 387 | 383 | 530 | 266 | 449 | 295 |
| UE (%) | 369 | 335 | 331 | 316 | 333 | 368 | 374 | 352 | 346 |
| M100 (psi) | 200 | 181 | 163 | 159 | 170 | 228 | 133 | 186 | 167 |
| Tension set (%) | 8.5 | 7.5 | 10 | 12 | 10 | 7.5 | 10 | 7.5 | 7.5 |
| CS (%) 100° C., 22 hrs | 31.9 | 26.9 | 28.9 | 21.5 | 30.5 | 67.8 | 44.9 | 30.4 | 39.3 |
| MVT g/m$^2$/day | 0.30 | 0.36 | 0.35 | 0.31 | 0.37 | 0.40 | 0.36 | 0.36 | 0.35 |
| O$_2$ cc/m$^2$/day | 303 | 327 | 349 | 438 | 339 | 355 | 356 | 320 | 344 |
| Cores/100 punctures | 2 | 0 | 4 | 0 | 2 | 6 | 8 | 6 | 0 |

In Tables 1 and 2 the examples C1–C6 are comparative examples, and do not represent examples of the invention. Table 1 sets forth the formulations of comparative examples C1–C6, and formulations of examples of the invention 7–18. Table 2 sets forth the properties of the thermoplastic vulcanizates prepared from these formulations.

that these latter thermoplastic vulcanizates showed fewer than 10 cores per 100 punctures of vial stoppers prepared from the compositions. Thermoplastic vulcanizates with coring values in the range of 0 to 10 cores per 100 punctures, preferably 5 cores or less per 100 punctures, are suitable for packaging of pharmaceuticals, for example as molded vial closures.

While in accordance with the Patent Statutes the best mode and preferred embodiment are set forth, the scope of the invention is not limited thereto but rather by the scope of the claims.

What is claimed is:

1. A thermoplastic vulcanizate consisting essentially of
   (a) 100 parts by weight of a rubber selected from the group consisting of butyl rubber, halobutyl rubber, and mixtures thereof;
   (b) from about 20 to about 25 parts by weight of a thermoplastic polypropylene resin;
   (c) from about 30 to about 40 parts by weight of a hydrogenated poly(styrene-b-isoprene-b-styrene) block copolymer; and
   (d) from about 45 to about 55 parts by weight of a polybutene oil plasticizer, wherein said rubber is at least partially vulcanized.

2. The thermoplastic vulcanizate of claim 1, wherein the rubber is chlorobutyl rubber.

3. The thermoplastic vulcanizate of claim 1, wherein the rubber is fully vulcanized.

4. The thermoplastic vulcanizate of claim 1, wherein the rubber is present as micro-size particles within a co-continuous matrix of thermoplastic polypropylene resin and block copolymer.

5. A molded closure prepared from the thermoplastic vulcanizate consisting essentially of
   (a) 100 parts by weight of a rubber selected from the group consisting of butyl rubber, halobutyl rubber, and mixtures thereof;
   (b) from about 20 to about 25 parts by, weight of a thermoplastic polypropylene resin;
   (c) from about 30 to about 40 parts by weight of a hydrogenated poly(styrene-b-isoprene-b-styrene) block copolymer; and
   (d) from about 45 to about 55 parts by weight of a polybutene oil plasticizer, wherein said polybutene is a copolymer of isobutylene, 1-butene and $\alpha$-butylene, and wherein said rubber is at least partially vulcanized.

6. The closure of claim 5 used as a pharmaceutical closure.

7. A process for preparing a thermoplastic vulcanizate, comprising the steps of blending
   (a) 100 parts by weight of a rubber selected from the group consisting of butyl rubber, halobutyl rubber, and mixtures thereof;
   (b) from about 20 to about 25 parts by weight of a thermoplastic polypropylene resin;
   (c) from about 30 to about 40 parts by weight of a hydrogenated poly(styrene-b-isoprene-b-styrene) block copolymer;
   (d) from about 45 to about 55 parts by weight of a polybutene oil plasticizer; and
   (e) a curing agent, and curing said rubber by dynamic vulcanization.

\* \* \* \* \*